United States Patent [19]
Menon et al.

[11] Patent Number: 6,159,540
[45] Date of Patent: Dec. 12, 2000

[54] POLYFUNCTIONAL ORGANOSILANE TREATMENT OF SILICA

[75] Inventors: Vinayan C. Menon; Stephen Wallace, both of Albuquerque, N. Mex.; Alok Maskara, Evanston, Ill.; Douglas M. Smith, Albuquerque, N. Mex.; Kenneth C. Koehlert, Carlisle, Mass.

[73] Assignee: Cabot Corporation, Boston, Mass.

[21] Appl. No.: 09/231,356

[22] Filed: Jan. 13, 1999

Related U.S. Application Data

[60] Provisional application No. 60/071,359, Jan. 15, 1998.
[51] Int. Cl.⁷ .............................. B01J 13/00; B05D 7/00; C01B 33/149
[52] U.S. Cl. ........................ 427/220; 106/490; 423/337; 428/405; 516/100
[58] Field of Search .......................... 516/100; 106/490; 423/337; 427/220; 428/405

[56] References Cited

U.S. PATENT DOCUMENTS

| | | |
|---|---|---|
| 2,589,705 | 3/1952 | Kistler . |
| 2,739,075 | 3/1956 | Iler . |
| 2,786,042 | 3/1957 | Iler . |
| 2,802,850 | 8/1957 | Wetzel . |
| 3,015,645 | 1/1962 | Tyler . |
| 3,122,520 | 2/1964 | Lentz . |
| 3,627,724 | 12/1971 | Lambert ............................ 106/490 X |
| 3,652,214 | 3/1972 | Aboutboul et al. . |
| 4,072,796 | 2/1978 | Reinhardt et al. ..................... 428/405 |
| 4,116,919 | 9/1978 | Elias et al. . |
| 4,208,316 | 6/1980 | Nauroth et al. ..................... 428/405 X |
| 4,344,800 | 8/1982 | Lutz . |
| 4,388,449 | 6/1983 | Bonnet et al. .......................... 525/477 |
| 4,644,077 | 2/1987 | Gupta ..................................... 556/457 |
| 4,715,986 | 12/1987 | Grüning et al. ........................ 516/100 |
| 4,738,839 | 4/1988 | Schönfeld ............................... 423/339 |
| 4,950,635 | 8/1990 | Williams et al. ..................... 428/405 X |
| 5,008,305 | 4/1991 | Kennan et al. .......................... 523/212 |
| 5,013,585 | 5/1991 | Shimizu et al. ........................ 427/220 |
| 5,057,151 | 10/1991 | Schuster et al. ..................... 428/405 X |
| 5,270,027 | 12/1993 | Balducci et al. ........................ 423/338 |
| 5,342,597 | 8/1994 | Tunison, III ............................ 423/335 |
| 5,565,142 | 10/1996 | Deshpande et al. ................. 516/100 X |
| 5,680,713 | 10/1997 | Forbert et al. ............................ 34/342 |
| 5,708,069 | 1/1998 | Burns et al. ............................. 524/403 |
| 5,922,449 | 7/1999 | Revis .................................. 428/405 X |

FOREIGN PATENT DOCUMENTS

| | | |
|---|---|---|
| 0 372 251 | 6/1990 | European Pat. Off. . |
| 0 900 829 A1 | 3/1999 | European Pat. Off. . |
| 0 928 818 A2 | 7/1999 | European Pat. Off. . |
| 2 065 572 | 7/1974 | Germany . |
| 35 25 802 | 1/1987 | Germany . |
| 35 43 172 | 6/1987 | Germany . |
| 44 19 234 | 12/1995 | Germany . |
| 682574 | 11/1952 | United Kingdom . |
| 907179 | 10/1962 | United Kingdom . |
| 1062599 | 3/1967 | United Kingdom . |
| 1110331 | 4/1968 | United Kingdom . |
| 98/45210 | 10/1998 | WIPO . |

OTHER PUBLICATIONS

Yamaguchi et al., *Chemical Abstracts*, 107(18), abstract. No. 157559 (Nov. 2, 1987).
Derwent Publications, Ltd., London, GB; Class A60, AN 1990–110367, XP002116901 (JP 02 059417 A abstract) (Feb. 28, 1990).
Heley et al., *Journal of Non–Crystalline Solids*, 186, 30–36 (1995).
Herrmann et al., *Journal of Non–Crystalline Solids*, 186, 380–387 (1995).
Lutz et al., *Rubber Chemistry and Technology*, 58, 939–952 (1985).
Polmanteer et al., *Rubber Chemistry and Technology*, 48, 795–808 (1975).

*Primary Examiner*—Richard D. Lovering

[57] ABSTRACT

The present invention provides a method of treating silica wherein silica is reacted with a di- or tri-functional organosilane in an aqueous acid medium to provide a crude organosilane-capped silica product containing organosilicon impurities. The organosilicon impurities are extracted from the crude product with an organic liquid to provide a purified product consisting essentially of organosilane-capped silica. The purified product is dried to provide a dry organosilane-capped silica. The aqueous acid medium can include a displacing reagent which displaces at least one reactive functional group of the di- or tri-functional organosilane. The present invention further provides-continuous methods of treating silica with di- and tri-functional organosilanes, wherein the organic liquid and/or the organosilicon impurities are recycled and reused.

28 Claims, No Drawings

POLYFUNCTIONAL ORGANOSILANE TREATMENT OF SILICA

This patent application claims the benefit of U.S. Provisional patent application Ser. No. 60/071,359 filed Jan. 15, 1998.

TECHNICAL FIELD OF THE INVENTION

The present invention relates to a method of treating silica with organosilane reagents.

BACKGROUND OF THE INVENTION

Silica, an inorganic material having silicon dioxide ($SiO_2$) as a basic structural unit, is useful in a wide variety of commercial applications. Silica exists in a variety of molecular forms, which include, for example, monomers, dimers, oligomers, cyclic forms, and polymers. In addition, silica can be amorphous, crystalline, hydrated, solvated, or dry, and can exist in a variety of particulate and aggregation states.

Amorphous silica can be formed by molecular precipitation, for example, by cooling a supersaturated solution, concentrating an undersaturated solution, or by careful hydrolysis of a solution of a labile silica precursor, such as a $SiCl_4$, esters of silica, $SiS_2$, $Si(OR)_4$, and the like, to provide a supersaturated solution of $Si(OH)_4$, from which precipitates amorphous silica.

Pyrogenic, or "fumed silica", which has a particle size from about 2–20 nm, is formed from the vapor phase. For example, silica (usually sand) can be vaporized at about 2000° C. and cooled to form anhydrous amorphous silica particles. Alternatively, silica can be sublimed at about 1500° C. in the presence of a reducing agent (e.g., coke) to form SiO, which can be oxidized to form particulate silica. Other methods of producing fumed silica include, for example, oxidation of $SiCl_4$ at high temperatures or burning $SiCl_4$ in the presence of methane or hydrogen.

Silica solutions exhibit polymerization behavior, resulting in the increase of Si—O—Si bonds and decrease of Si—OH bonds. In an aqueous medium, amorphous silica dissolves (and/or depolymerizes), forming $Si(OH)_4$, which undergoes polymerization to form discrete particles with internal Si—O—Si bonds and external Si—OH bonds on the particle surface. Under certain conditions, the polymeric silica particles thus formed will further associate to give chains and networks comprising the individual particles.

Generally, under neutral or alkaline conditions (pH 7 or greater), the particles tend to grow in size and decrease in number, whereas under acidic conditions (pH<7), the particles have a greater tendency to agglomerate to form chains, and eventually three dimensional networks. If salts are present which neutralize the charge produced on the particle surface, agglomeration of particles will be more likely to occur under neutral or alkaline conditions.

The term "sol" refers to a stable dispersion of discrete, colloid-size particles of amorphous silica in aqueous solutions. Under the proper conditions, sols do not gel or settle even after several years of storage, and may contain up to about 50% silica and particle sizes up to 300 nm, although particles larger than about 70 nm settle slowly. A sol can be formed, for example, by growing particles to a certain size in a weakly alkaline solution, or by addition of dilute acid to a solution of sodium silicate (e.g., $Na_2SiO_3$) with rapid mixing, until the pH drops to about 8–10, followed by removal of $Na^+$ (e.g., by ion-exchange resin or electrodialysis). Silica sols, depending upon the type of silica, the particle size, and the nature of the particles, can form gels under mildly acidic to strongly acidic conditions.

The term "gel" refers to a coherent, rigid, continuous three-dimensional network of particles of colloidal silica. Gels can be produced by the aggregation of colloidal silica particles (typically under acidic conditions when neutralizing salts are absent) to form a three dimensional gel microstructure. Whether a gel will form under a particular set of conditions, however, can depend on the silica properties, such as, for example, particle size and the nature of the particle surface. The term "hydrogel" refers to a gel in which the pores (spaces within the gel microstructure) are filled with water, Similarly, the term "alcogel" refers to a gel in which the pores are filled with an alcohol. When a gel is dried (liquid removed from the pores) by means in which the coherent gel microstructure collapses (e.g., by solvent evaporation), a relatively high density collapsed powder, or "xerogel", is formed. In contrast, when a gel is dried by means in which the gel microstructure is preserved (e.g., supercritical drying as described in U.S. Pat. No. 3,652,214), a low density "aerogel" is formed. Silica aerogels have very unusual and highly desirable properties such as, for example, optical transparency, extremely low density, and unprecedented low thermal conductivity. See Herrmann et al., *Journal of Non-Crystalline Solids*, 186, 380–387 (1995). Silica aerogels are useful in a wide variety of applications which include, for example, thermal insulators and reinforcing fillers for elastomers. Although raw material costs are very low, economically feasible processes for producing aerogels have been pursued unsuccessfully for decades.

It is known that the hydrophobic surface modification of silica can dramatically improve silica properties for use in numerous valuable commercial applications. U.S. Pat. No. 3,015,645 ("Tyler") discloses that hydrophobic silicon powders prepared by reacting silica with hydrophobing agents, such as organosilicon halides, can produce superior reinforcing fillers for siloxane elastomers. U.S. Pat. No. 3,122,520 ("Lentz") discloses an improved method of preparing Tyler-type organosilated silica fillers, which improvement involves subjecting a silica sol to a strong acid at low pH (less than 1) and high temperatures prior to introducing the hydrophobing agent. U.S. Pat. No. 2,786,042 ("Iler") discloses hydrophobic organic surface-modified silica, organosols, and preparation methods thereof.

Although strongly acidic conditions purportedly improve the surface modification of silica, there are serious drawbacks to using strong acids in the production of low density organic-modified silica, particularly when the modifying agent is a reactive organosilane. When trimethylchlorosilane (TMCS) is used as the organic modifying reagent, the formation of undesirable reaction by-products can be controlled to a certain extent under strongly acidic conditions. However, when lower cost di- or tri-functional organosilane modifying agents such as dimethyldichlorosilane (DMDCS) or methyltrichlorosilane (MTCS) are used under strongly acidic conditions, they tend to form by-products, polymerize, and/or crosslink with other silanes, resulting in a higher density product, which is undesirable. Such side reactions can result in poor product quality, low yield, and inefficient utilization of di- and tri-functional organosilane surface modifying agents. These shortcomings pose a substantial barrier to the commercialization of processes related to the production of surface-modified silica with di- and tri-functional organosilane surface modifying agents.

In view of the foregoing problems, there exists a need for an improved method for the surface modification of silica using di- and tri-functional organosilane surface modifying agents. The present invention provides such a method. These and other advantages of the present invention, as well as additional inventive features, will be apparent from the description of the invention provided herein.

BRIEF SUMMARY OF THE INVENTION

The present invention provides a method of treating silica wherein silica is reacted with a di- or tri-functional organosilane in an aqueous acid medium to provide a crude organosilane-capped silica product containing organosilicon impurities. The organosilicon impurities are extracted from the crude product with an organic liquid to provide a purified product consisting essentially of organosilane-capped silica. The purified product is dried to provide a dry organosilane-capped silica. The aqueous acid medium can include a displacing reagent which displaces at least one reactive functional group of the di- or tri-functional organosilane.

The present invention further provides continuous methods of treating silica with di- and tri-functional organosilanes, wherein the organic liquid and/or the organosilicon impurities are recycled and reused.

DESCRIPTION OF THE PREFERRED EMBODIMENTS

The present invention provides a method of treating silica wherein silica is reacted with a di- or tri-functional organosilane in an aqueous acid medium to provide a crude organosilane-capped silica product containing organosilicon impurities. The organosilicon impurities are extracted from the crude product with an organic liquid to provide a purified organosilane-capped silica product which is substantially free of organosilicon impurities. The purified product is then dried to provide a dry organosilane-capped silica which is substantially free of organosilicon impurities.

The present invention utilizes less costly di- or tri-functional organosilanes, sometimes herein referred to as "capping agents", for the treatment of silica. The term "organosilane-capped silica" refers to the reaction product of silica and the di- or tri-functional organosilane capping agent. As the term "organosilane-capped silica" suggests, the silanols of the silica form a covalent bond (i.e., are "capped") with the di- or tri-functional organosilane capping agent. The term "di- or tri-functional" refers to the number of reactive functional groups on the organosilane capping agent which are capable of being displaced by a silica silanol, resulting in a covalent bond between the silica silanol and the silicon atom of the organosilane capping agent. Thus, a di-functional organosilane has two reactive functional groups capable of being displaced by a silica silanol, and a tri-functional organosilane has three reactive functional groups.

Any suitable di- or tri-functional organosilane can be utilized in the method of the present invention. Preferably, the capping agent is a di-functional organosilane of the formula $R_1R_2SiX_2$ or a tri-functional organosilane of the formula $R_1SiX_3$, wherein $R_1$ and $R_2$ can be the same or different and each is $C_1-C_6$ alkyl, fluoroalkyl, aryl, or arylmethyl; and X is Cl, Br, I, or $OR_4$, wherein $R_4$ is $C_1-C_4$ alkyl. The di-functional capping agent is preferably a dialkyldichlorosilane, more preferably wherein $R_1$ and $R_2$ are $C_1-C_3$ alkyl. Most preferably, the di-functional capping agent is dimethyldichlorosilane (DMDCS). The tri-functional capping agent is preferably an alkyltrichlorosilane, more preferably wherein $R_1$ is $C_1-C_3$ alkyl. Most preferably, the tri-functional capping agent is methyltrichlorosilane (MTCS). In addition to lower cost, the utilization of polyfunctional organosilanes as reagents in the preparation of treated silica can be particularly beneficial from an environmental standpoint, particularly since MTCS is highly abundant in waste streams generated from silicone processes. Thus, the beneficial use of such waste products is highly desirable.

Any suitable acid can be used in the method of the present invention. Preferably, the aqueous acid medium comprises a mineral acid, which is preferably hydrochloric acid or sulfuric acid. Most preferably, the mineral acid is hydrochloric acid. The present invention utilizes high acid concentrations. Preferably the mineral acid is present in the aqueous acid medium in concentrations greater than about 3 M, more preferably greater than about 10 M.

Unlike the monofunctional organosilanes (e.g. trimethylchlorosilane), di- and tri-functional silanes, particularly DMDCS and MTCS, are more reactive and tend to polymerize and crosslink under strongly acidic reaction conditions, resulting in the formation of polymeric organosilicon by-products. The formation of polymeric organosilicon by-products is difficult to control under strongly acidic conditions. Significant contamination of the organosilane-capped silica with the polymeric organosilicon impurities results in a product with undesirable qualities such as, for example, high density, low degree of "capping", and uncharacteristically low internal surface area. It has been discovered that significant contamination of the product with polymeric organosilicon impurities from di- or tri-functional organosilanes occurs during drying of the crude organosilane-capped silica, particularly in the presence of unreacted capping agents such as DMDCS and MTCS. Thus, even in applications where the treated silica product is isolated before the capping agent is totally consumed (where a lesser degree of surface coverage of the silica with the capping agent is desired), significant contamination can occur. Although not intending to be bound by any particular theory, it is believed that drying conditions promote further polymerization and crosslinking of the impurities (polymeric and unreacted) to the di- and tri-functional organosilanes which have already covalently bonded to the silanols on the silica surface.

In the method of the present invention, the polymeric and/or unreacted organosilicon impurities are removed from the crude organosilane-capped silica by extraction with an organic liquid prior to drying. Any suitable organic liquid can be used to perform the extraction. Preferably, the organic liquid is hexamethyldisiloxane.

Any suitable volume can be used in the organic liquid extraction. The relative volume of organic liquid used in the extraction depends on many variables such as, for example, the amount of organisilicon impurities per unit volume of crude product, the nature of the organic liquid, and the solubility of the organosilicon impurities. A person of ordinary skill in the art will appreciate that techniques such as, for example, BET surface area values, BET C values, and thermal gravimetric analysis (TGA) can be utilized to detect the presence of polymeric substances in capped silica. BET values are typically based on measurement of $N_2$ adsorption at 77 K. In a typical adsorption experiment, the amount of nitrogen adsorbed at five different relative pressures over the range 0.05 to 0.25 is obtained and analyzed using the Brunauer-Emmett-Teller (BET) model, which can be found in Gregg, S. J. and Sing, K. S. W, "Adsorption, Surface Area and Porosity," p. 285, Academic Press, New York (1991). The BET model provides the surface area and C value for the powders. Generally, a significant TGA weight loss (greater than about 6 wt. %) in the dry organosilane-capped silica from about 200–400° C. indicates the presence of polymeric materials, whereas insignificant TGA weight loss (less than about 6 wt. %) from about 200–400° C. indicates low polymer content or the absence thereof. Preferably, the crude product is extracted with a sufficient volume of the organic liquid such that the dry organosilane-capped silica exhibits a TGA weight loss of less than about 6 wt. % from about 200° C. to about 400° C.

To reduce the formation of polymeric organosilicon by-products, the aqueous acid medium can include a displacing reagent which displaces at least one reactive functional group of the di- or tri-functional organosilane to provide a less reactive organosilane species. Any suitable displacing reagent can be utilized. The reaction between the displacing reagent and the di- or tri-functional organosilane need not proceed to completion. A person of ordinary skill in the art will appreciate that the extent of reaction of a particular displacing reagent with the reactive functional groups of a particular polyfunctional organosilane depends on variables such as, for example, the relative concentration and reactivity of both species. Although a distribution of different reactant species can form when the displacing reagent reacts with the di- or tri-functional organosilane, the net effect will be a lowered degree of polymerization. When, for example, the displacing reagent is an alcohol and MTCS is the polyfunctional organosilane, the distribution of possible reactant species can be illustrated by the following equation:

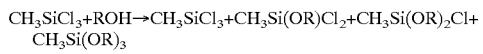

$$CH_3SiCl_3 + ROH \rightarrow CH_3SiCl_3 + CH_3Si(OR)Cl_2 + CH_3Si(OR)_2Cl + CH_3Si(OR)_3$$

wherein $CH_3SiCl_3$ represents unreacted MTCS, $CH_3Si(OR)Cl_2$ represents the displacement of one reactive chloride, $CH_3Si(OR)_2Cl$ represents the displacement of two reactive chlorides, and $CH_3Si(OR)_3$ represents the displacement of all the available chlorides. The reactivity of alcohols with di- or tri-functional organosilanes decreases significantly with increasing steric hinderance about the alcohol hydroxyl. Thus, primary alcohols are significantly more reactive than secondary alcohols. For example, isopropanol can be used as an unreactive cosolvent at room temperature (see Example 1). Tertiary alcohols are the least reactive. Primary alcohols such as, for example, methanol and ethanol react more rapidly with di- or tri-functional organosilanes. Lower molecular weight primary alcohols react faster than higher molecular weight primary alcohols. Generally, the reactivity of the organosilicon species decreases with increasing alcohol substitution. Preferably, the displacing reagent is a primary alcohol of the formula R—OH, wherein R is $C_1$–$C_6$ n-alkyl, more preferably $C_1$–$C_3$ n-alkyl, most preferably methanol.

Any suitable concentration of displacing reagent can be used in the present invention. When the displacing reagent is a mono-alcohol as described hereinbefore, the molar ratio of the di- or tri-functional organosilane to the mono-alcohol is preferably one to one less than the number of reactive functional groups of the di- or tri-functional organosilane. Thus, when the organosilane is a di-functional organosilane, the molar ratio of di-functional organosilane to mono-alcohol is preferably 1:1. Similarly, when the organosilane is a tri-functional organosilane, the molar ratio of the tri-functional organosilane to mono-alcohol is preferably 1:2. Optionally, the displacing reagent can be a diol wherein each displacing reagent molecule possesses two reactive sites (hydroxyls) capable of displacing a functional group on the di- or tri-functional organosilane. Preferably, the diol displacing reagent is ethylene glycol or propylene glycol. When the organosilane is a di-functional organosilane, the molar ratio of di-functional organosilane to diol preferably is 2:1. When the organosilane is a tri-functional organosilane, the molar ratio of tri-functional organosilane to diol preferably is 1:1.

Recycling of reagents is highly preferred, not only to further reduce costs and optimize reagent usage, but also to reduce the production of environmental wastes. The polymeric reaction by-products from the di- or tri-functional organosilane can be reused after being extracted from the crude product. Polymeric organosilicon by-products derived from di- or tri-functional organosilanes can be depolymerized in strong aqueous acid to regenerate a monomeric di- or tri-functional organosilane capping agent. For example, polymeric by-products from DMDCS or MTCS can be depolymerized in about 3 to about 12 M HCl to regenerate DMDCS and MTCS, respectively. Preferably, the polymeric organosilicon reaction by-products are added back into the aqueous acid medium to regenerate a di- or tri-functional organosilane, and reused as capping agents in subsequent reactions in the method of the present invention. When the recovered organosilicon impurities are unreacted di- or tri-functional organosilanes, they preferably are added back into the aqueous acid medium and reused as capping agents in subsequent processes.

After extracting the organosilicon impurities from the organosilane-capped silica, the organic liquid can be recycled and reused in subsequent extractions. Any suitable recycling method can be utilized. Preferably, the organic liquid is separated from the organosilicon impurities by distillation. If volatile impurities such as, for example, DMDCS or MTCS, are present and co-distill or azeotrope with the organic liquid during the recycling process, fractional distillation or multiple distillations can be utilized to separate the organic liquid from the impurities in sufficient purity for reuse.

While the present inventive method can be performed in a batch process, the present invention further provides a continuous process for the treatment of silica wherein the polymeric reaction by-products and/or the organic liquid are continuously separated, recovered, and reused as provided herein. The present invention also provides a continuous process for the treatment of silica, wherein the unreacted di- or tri-functional organosilanes are continuously separated from the organic liquid, recovered, and reused as provided herein. Preferably, the polymeric reaction by-products, organic liquid, and unreacted di- or tri-functional organosilanes are all recovered, reused, and recycled in a continuous process.

The following examples further illustrate the present invention but, of course, should not be construed as in any way limiting its scope.

EXAMPLE 1

This example illustrates a method of treating silica with a di- or tri-functional organosilane in an aqueous acid medium to provide a crude product of organosilane-capped silica containing polymeric organosilicon impurities.

To 400 ml of an aqueous composition of fumed silica available from Cabot Corporation under the trademark Cab-O-Sil® HS5 (4 wt.% solids) was added 200 ml 12.5 M HCl, and the mixture was refluxed for 3 hours. After cooling the mixture to room temperature, 200 ml of isopropanol was added, followed by the di-functional organosilane dimethyldichlorosilane (DMDCS) in a molar ratio of 1:1 (mole DMDCS:mole $SiO_2$). The mixture was stirred for 0.5 hours at room temperature, and 500 ml of heptane was added. After the mixture separated into two layers, the organogel heptane layer was separated, washed with water, azeotroped, and dried to provide a crude product of DMDCS-capped silica containing polymeric organosilicon impurities. $N_2$ adsorption of the DMDCS-capped silica at 77 K was measured. The DMDCS-capped silica had a BET surface area of 81 $m^2/g$ and a C value of 12. The dry DMDCS-capped silica exhibited a significant weight loss between 200° C. and 400° C., indicating the presence of polymeric organosilicon impurities.

EXAMPLE 2

This example illustrates the removal of polymeric organosilicon impurities from silica treated with a di- or tri-functional organosilane capping agent. A sample of silica is treated with DMDCS according to Example 1 except, prior to drying, the crude product is extracted with hexamethyldisiloxane until the polymeric organosilicon impurities are no longer present in the extracts by HPLC analysis. The product is then dried to provide purified DMDCS-capped silica which is substantially free of organosilicon impurities.

All of the references cited herein, including patents, patent applications, and publications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A method of treating silica comprising:
   (a) reacting silica with a di- or tri-functional organosilane in an aqueous acid medium to provide a crude product comprising organosilane-capped silica and organosilicon impurities,
   (b) extracting said organosilicon impurities from said crude product with an organic liquid to provide a purified product consisting essentially of organosilane-capped silica, and
   (c) drying said purified product to provide a dry organosilane-capped silica.

2. The method of claim 1, wherein said di-functional organosilane is dimethyldichlorosilane.

3. The method of claim 1, wherein said tri-functional organosilane is trichloromethylsilane.

4. The method of claim 1, wherein said aqueous acid medium comprises a mineral acid selected from the group consisting of hydrochloric acid and sulfuric acid.

5. The method of claim 4, wherein said mineral acid is hydrochloric acid.

6. The method of claim 5, wherein the concentration of said mineral acid in said aqueous acid medium is greater than about 3 M.

7. The method of claim 5, wherein the concentration of said mineral acid in said aqueous acid medium is greater that about 10 M.

8. The method of claim 1, wherein said organosilicon impurities comprise polymeric reaction by-products from said di- or tri-functional organosilane.

9. The method of claim 8, wherein said polymeric reaction by-products from said di- or tri-functional organosilane are added to said aqueous acid medium to regenerate a di- or tri-functional organosilane and reused in step (a).

10. The method of claim 9, wherein said organic liquid is recycled and reused in step (a).

11. The method of claim 10, wherein said organic liquid is hexamethyldisiloxane.

12. The method of claim 10, wherein said method is a continuous process.

13. The method of claim 1, wherein said organosilicon impurities comprise unreacted di- or tri-functional organosilane.

14. The method of claim 13, wherein said unreacted di- or tri-functional organosilane is added to said aqueous acid medium and reused in step (a).

15. The method of claim 14, wherein said organic liquid is recycled and reused in step (a).

16. The method of claim 15, wherein said organic liquid is hexamethyldisiloxane.

17. The method of claim 15, wherein said method is a continuous process.

18. The method of claim 1, wherein said organic liquid is hexamethyldisiloxane.

19. The method of claim 1, wherein said dry organosilane-capped silica has a thermal gravimetric analysis (TGA) weight loss of less than about 6 wt. % from about 200° C. to about 400° C.

20. The method of claim 1, wherein said aqueous acid medium includes a displacing reagent which displaces at least one reactive functional group of said di- or tri-functional organosilane.

21. The method of claim 20, wherein said displacing reagent is an alcohol selected from the group consisting of ethylene glycol and propylene glycol.

22. The method of claim 21, wherein said organosilane is a tri-functional organosilane, and the molar ratio of said tri-functional organosilane to said displacing reagent is 1:1.

23. The method of claim 20, wherein said displacing reagent is an alcohol of the formula R—OH, wherein R is $C_1$–$C_6$ n-alkyl.

24. The method of claim 23, wherein said alcohol is methanol.

25. The method of claim 23, wherein the molar ratio of said di- or tri-functional organosilane to said alcohol is one to one less than the number of reactive functional groups of said di- or tri-functional organosilane.

26. The method of claim 23, wherein said organosilane is a di-functional organosilane, and the molar ratio of said di-functional organosilane to said alcohol is 1:1.

27. The method of claim 23, wherein said organosilane is a tri-functional organosilane, and the molar ratio of said tri-functional organosilane to said alcohol is 1:2.

28. The method of claim 1, wherein said organic liquid is recycled after extracting said organosilicon impurities and reused in step (a).

* * * * *